(12) United States Patent  
Mehdi

(10) Patent No.: US 10,785,107 B2  
(45) Date of Patent: Sep. 22, 2020

(54) METHOD AND APPARATUS FOR OPTIMIZING LEGACY NETWORK INFRASTRUCTURE

(71) Applicant: Microsoft Technology Licensing, LLC, Redmond, WA (US)

(72) Inventor: Muhammad Muntazir Mehdi, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 106 days.

(21) Appl. No.: 15/980,915

(22) Filed: May 16, 2018

(65) Prior Publication Data

US 2019/0356549 A1 Nov. 21, 2019

(51) Int. Cl.
*H04L 12/24* (2006.01)
*H04L 12/26* (2006.01)

(52) U.S. Cl.
CPC ......... *H04L 41/0823* (2013.01); *H04L 41/12* (2013.01); *H04L 41/145* (2013.01); *H04L 41/22* (2013.01); *H04L 43/0876* (2013.01); *H04L 43/12* (2013.01); *H04L 43/50* (2013.01)

(58) Field of Classification Search
None
See application file for complete search history.

(56) References Cited

U.S. PATENT DOCUMENTS

| | | | | |
|---|---|---|---|---|
| 5,568,471 A * | 10/1996 | Hershey | ................. | H04L 29/06 370/245 |
| 5,598,532 A * | 1/1997 | Liron | .................. | H04L 41/0826 370/254 |
| 6,393,486 B1 * | 5/2002 | Pelavin | ............... | H04L 41/0813 709/238 |
| 7,327,683 B2 * | 2/2008 | Ogier | .................... | H04L 1/1614 370/236 |
| 8,619,630 B2 * | 12/2013 | Riley | .................... | H04L 47/781 370/255 |
| 2003/0009547 A1 * | 1/2003 | Benfield | ............. | H04L 41/0233 709/223 |
| 2003/0046378 A1 * | 3/2003 | Zimmel | ................ | H04L 41/145 709/223 |
| 2003/0046390 A1 * | 3/2003 | Ball | ........................ | H04L 41/12 709/224 |

(Continued)

*Primary Examiner* — Jamaal Henson
(74) *Attorney, Agent, or Firm* — Ray Quinney & Nebeker P.C; James Bullough

(57) ABSTRACT

A system comprises a processor and a non-transitory computer-readable medium to store instructions for execution by the processor. The instructions are configured to discover a topology of a network in an on-premises datacenter, where the topology includes hardware and software components in the on-premises datacenter and in one or more hops from an external network to a gateway of the network. The instructions are configured to determine a plurality of parameters of the components that affect performance of applications and services running on the network. The instructions are configured to determine, based on the discovered topology and the parameters, an optimal topology for the network that optimizes one or more of the parameters to improve the performance of applications and services running on the network.

10 Claims, 8 Drawing Sheets

(56) References Cited

U.S. PATENT DOCUMENTS

| | | | | |
|---|---|---|---|---|
| 2003/0086425 A1* | 5/2003 | Bearden | H04M 3/2236 | 370/392 |
| 2003/0091165 A1* | 5/2003 | Bearden | H04L 41/22 | 379/88.08 |
| 2003/0097438 A1* | 5/2003 | Bearden | H04L 41/12 | 709/224 |
| 2004/0031030 A1* | 2/2004 | Kidder | G06F 1/14 | 717/172 |
| 2004/0186696 A1* | 9/2004 | Alicherry | H04L 41/145 | 703/1 |
| 2004/0236457 A1* | 11/2004 | Stabelfeldt | G06F 30/23 | 700/132 |
| 2004/0236547 A1* | 11/2004 | Rappaport | H04L 41/12 | 703/2 |
| 2005/0047350 A1* | 3/2005 | Kantor | H04L 41/12 | 370/254 |
| 2005/0108696 A1* | 5/2005 | Dai | G06F 8/456 | 717/151 |
| 2005/0169193 A1* | 8/2005 | Black | H04L 12/462 | 370/254 |
| 2007/0067296 A1* | 3/2007 | Malloy | H04L 41/145 | |
| 2009/0116404 A1* | 5/2009 | Mahop | H04L 47/24 | 370/254 |
| 2009/0296719 A1* | 12/2009 | Maier | H04L 45/123 | 370/400 |
| 2010/0020722 A1* | 1/2010 | Farkas | H04L 41/12 | 370/254 |
| 2013/0003605 A1* | 1/2013 | Peterson | H04L 45/12 | 370/255 |
| 2013/0094366 A1* | 4/2013 | Lee | H04L 41/14 | 370/241 |
| 2014/0358492 A1* | 12/2014 | Stanislawski | G06F 16/29 | 703/1 |
| 2015/0249587 A1* | 9/2015 | Kozat | H04L 45/28 | 370/222 |
| 2018/0041396 A1* | 2/2018 | Li | H04L 41/12 | |

* cited by examiner

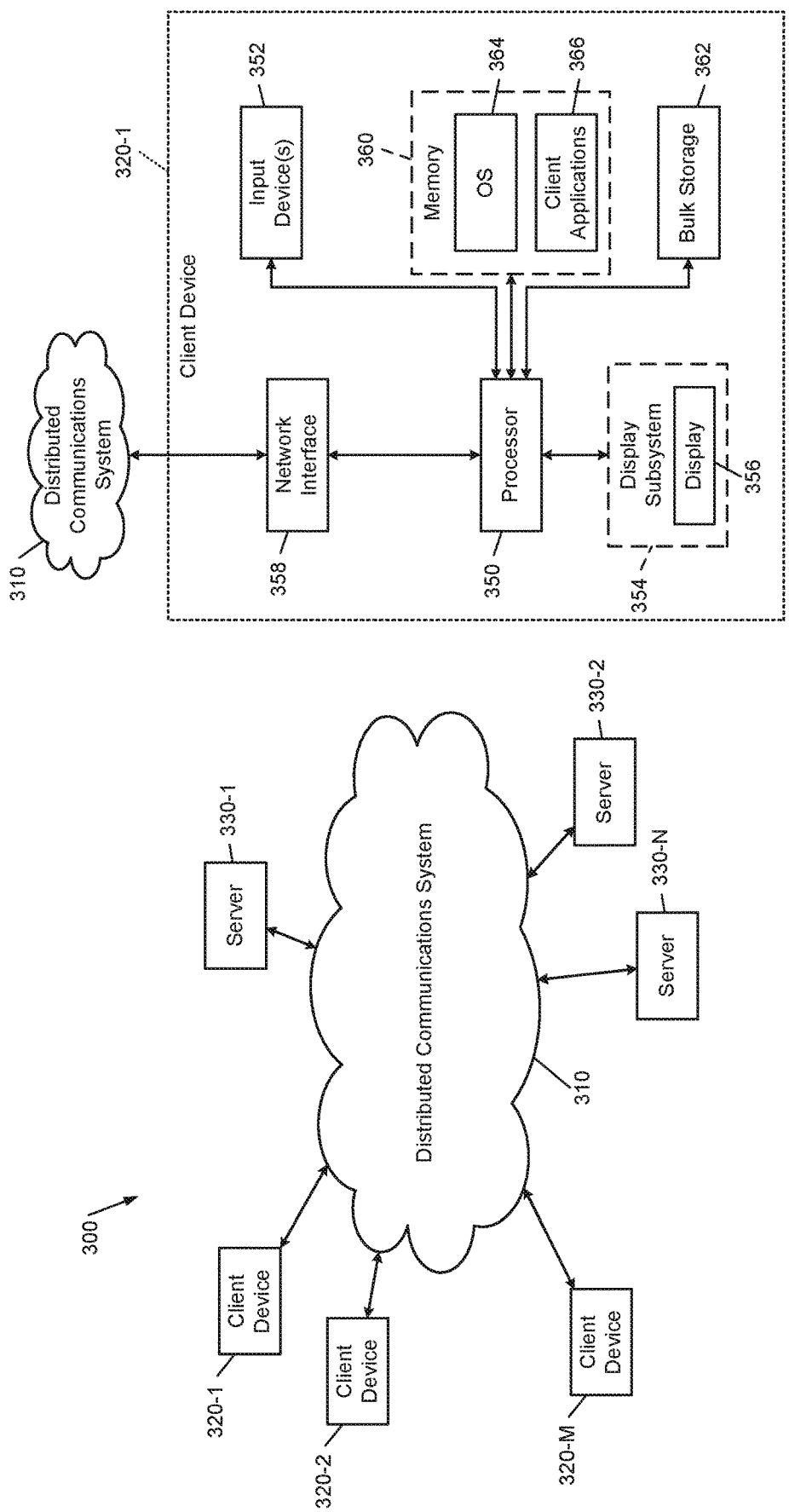

METHOD AND APPARATUS FOR OPTIMIZING LEGACY NETWORK INFRASTRUCTURE

FIELD

The present disclosure relates generally to network computing systems and more particularly to optimizing legacy network infrastructure.

BACKGROUND

Often, in underdeveloped communities and developing countries, some institutions such as universities can have legacy network infrastructure in place. Periodically, some of the legacy infrastructure may be partially upgraded with equipment manufactured using more recent technology. Such upgrades can create networks with hybrid network topologies, which do not improve network performance as intended by the upgrades.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system comprises a processor and a non-transitory computer-readable medium to store instructions for execution by the processor. The instructions are configured to probe a network by observing traffic through the network; discover a topology of the network based on the probing of the network; and discover a plurality of characteristics of the topology of the network including a number of layers of switches and routers in the network, a number of hops between different endpoints of the network, and a number of loops in the network, leading to a gateway in the network that connects the network to an external network. The instructions are configured to construct a model of the network based on the discovered topology of the network and the plurality of characteristics of the topology of the network; generate, based on the model of the network, flow patterns between different endpoints of the network; and process the flow patterns using graph theory. The instructions are configured to generate, based on the processing of the flow patterns, an alternate design for the network that reduces at least one of the plurality of characteristics of the topology of the network. The alternate design has less latency than the discovered topology of the network.

In other features, the instructions are further configured to generate an alternate configuration for an application or a service executed on the network, where the alternate configuration mitigates effects of one or more of the plurality of characteristics of the topology of the network on the performance of the application or service executed on the network.

In other features, the instructions are further configured to generate a visual representation of the topology of the network and the alternate design for the network.

In other features, the instructions are further configured to determine an upgrade path for one or more components of the network, generate a schedule to implement the upgrade path, and include the upgrade path and the schedule in the alternate design.

In other features, the instructions are further configured to determine load and utilization of the network based on the probing of the network; generate, based on the load and utilization of the network, a minimum configuration for the network that is sufficient to handle the load; and include the minimum configuration in the alternate design.

In other features, the switches and routers in different layers have different speeds or bandwidths; and the alternate design reduces a number of switches and routers having dissimilar speeds or bandwidths in at least one of the layers.

In other features, the alternate design eliminates one or more switches and routers having less than a predetermined speed or bandwidth in at least one of the layers; or the alternate design eliminates one or more of the layers of switches and routers having less than a predetermined speed or bandwidth, or having more than a predetermined number of switches and routers of dissimilar speeds or bandwidths; or the alternate design eliminates one or more of the layers of switches and routers having more than a predetermined number of switches and routers of dissimilar speeds or bandwidths.

In other features, the alternate design includes an additional switch or router having a similar speed or bandwidth as that of one of the switches or routers in at least one of the layers; or the alternate design includes an additional switch or router having a speed or bandwidth greater than that of the switches or routers in the layers, where the additional switch or router is added to the network at a location determined to reduce one or more of the number of hops between the different endpoints of the network and the number of loops in the network.

In other features, the instructions are further configured to identify elements of the topology that impede the traffic through the network; and generate the alternate design that excludes one or more of the elements or that includes a modification to the one or more of the elements, the modification including a rearrangement or an upgrade of the one or more of the elements.

In other features, the instructions are further configured to probe the network by injecting information into the network and observing a flow of the injected information through the network.

In still other features, a system comprises a processor and a non-transitory computer-readable medium to store instructions for execution by the processor. The instructions are configured to discover a topology of a network in an on-premises datacenter, where the topology includes hardware and software components in the on-premises datacenter and in one or more hops from an external network to a gateway of the network. The instructions are configured to determine a plurality of parameters of the components that affect performance of applications and services running on the network. The instructions are configured to determine, based on the discovered topology and the parameters, an optimal topology for the network that optimizes one or more of the parameters to improve the performance of applications and services running on the network.

In other features, the instructions are further configured to generate a visual representation of one or more of the discovered topology and the optimal topology of the network.

In other features, the instructions are further configured to generate the optimal topology by running simulations on models generated based on the discovered topology and the parameters using graph theory.

In other features, the optimal topology comprises one or more of the following: rearranging, replacing, or upgrading a component of the network; adding a component to the network; and reconfiguring one or more of the applications and services running on the network.

In other features, the parameters include a number of hops, layers, and loops in the network.

In other features, the system is installed in the on-premises datacenter or in a cloud computing system.

In other features, the instructions are further configured to determine an upgrade path for one or more of the components and the applications and services; generate a schedule to implement the upgrade path; and include the upgrade path and the schedule in the optimal topology.

In other features, the instructions are further configured to determine load and utilization of the network; generate, based on the load and utilization, a minimum configuration for the network that is sufficient to run the applications and services; and include the minimum configuration in the optimal topology.

In still other features, a system comprises a processor and a non-transitory computer-readable medium to store instructions for execution by the processor. The instructions are configured to discover a topology of a network in an on-premises datacenter, where the topology includes hardware and software components in the on-premises datacenter and in one or more hops from an external network to a gateway of the network. The instructions are configured to determine a plurality of parameters of the components that affect performance of applications and services running on the network, where the parameters include a number of hops, layers, and loops in the network. The instructions are configured to determine, by running simulations on models generated based on the discovered topology and the parameters using graph theory, an optimal topology for the network that optimizes one or more of the parameters to improve the performance of applications and services running on the network. The optimal topology comprises one or more of the following: rearranging, replacing, or upgrading a component of the network; adding a component to the network; reconfiguring one or more of the applications and services running on the network; an upgrade path and a schedule for upgrading one or more of the components, applications, and services; and a minimum configuration for the network that is sufficient to run the applications and services, the minimum configuration being determined by monitoring load and utilization of the network.

In still other systems a system comprises a processor and a non-transitory computer-readable medium to store instructions for execution by the processor. The instructions are configured to probe a network by observing traffic through the network; discover a topology of the network based on the probing of the network; and discover a plurality of characteristics of the topology of the network including a number of layers of switches and routers in the network, a number of hops between different endpoints of the network, and a number of loops in the network, leading to a gateway in the network that connects the network to an external network. The instructions are configured to construct a model of the network based on the discovered topology of the network and the plurality of characteristics of the topology of the network; generate, based on the model of the network, flow patterns between different endpoints of the network; and process the flow patterns using graph theory. The instructions are configured to generate, based on the processing of the flow patterns, an alternate configuration for an application or a service executed on the network. The alternate configuration mitigates effects of one or more of the plurality of characteristics of the topology of the network on the performance of the application or service executed on the network.

In other features, the instructions are further configured to generate, based on the processing, an alternate design for the network that reduces at least one of the plurality of characteristics of the topology of the network, where the alternate design has less latency than the discovered topology of the network.

In other features, the switches and routers in different layers have different speeds or bandwidths.

In other features, the alternate design reduces a number of switches and routers having dissimilar speeds or bandwidths in at least one of the layers.

In other features, the alternate design eliminates one or more switches and routers having less than a predetermined speed or bandwidth in at least one of the layers.

In other features, the alternate design eliminates one or more of the layers of switches and routers having less than a predetermined speed or bandwidth, or having more than a predetermined number of switches and routers of dissimilar speeds or bandwidths.

In other features, the alternate design eliminates one or more of the layers of switches and routers having more than a predetermined number of switches and routers of dissimilar speeds or bandwidths.

In other features, the alternate design includes an additional switch or router having a similar speed or bandwidth as that of one of the switches or routers in at least one of the layers.

In other features, the alternate design includes an additional switch or router having a speed or bandwidth greater than that of the switches or routers in the layers.

In other features, the additional switch or router is added to the network at a location determined to reduce one or more of the number of hops between the different endpoints of the network and the number of loops in the network.

In other features, the instructions are further configured to identify elements of the topology that imped the traffic through the network; and generate an alternate design for the network that excludes one or more of the elements or that includes a modification to the one or more of the elements, where the modification includes a rearrangement or an upgrade of the one or more of the elements.

In other features, the instructions are further configured to probe the network by injecting information into the network and observing a flow of the injected information through the network.

In still other features, a system comprises a processor and a non-transitory computer-readable medium to store instructions for execution by the processor. The instructions are configured to receive input including specifications for a network and infrastructure available for deploying the network and for connecting the network to an external network. The instructions are configured to construct a plurality of models of the network based on the input, each of the models having a different topology, where each topology includes a number of layers of switches and routers, a number of hops between different endpoints of the network, and a number of loops in the network, leading to a gateway in the network that connects the network to the external network. The instructions are configured to generate, for each of the models, flow patterns between different endpoints of the network; process the flow patterns using graph theory; and select, based on the processing of the flow patterns, one of the topologies having the least latency for deploying the network using the infrastructure.

In other features, the instructions are further configured to generate a configuration for an application or a service for execution on the network, where the configuration optimizes performance of the application or the service when executed on the network.

The above features and the additional features of the various aspects of the present disclosure described below are not mutually exclusive. Rather, one or more of these features (those mentioned above and those described below) can be combined.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 7 is a functional block diagram of a simplified example of a distributed network system that can be used to implement the cloud computing system and the datacenter shown in FIGS. 1 and 2.

FIG. 8 is a functional block diagram of a simplified example of a client device used in the distributed network system of FIG. 7.

In the drawings, reference numbers may be reused to identify similar and/or identical elements.

DETAILED DESCRIPTION

Figure 1:
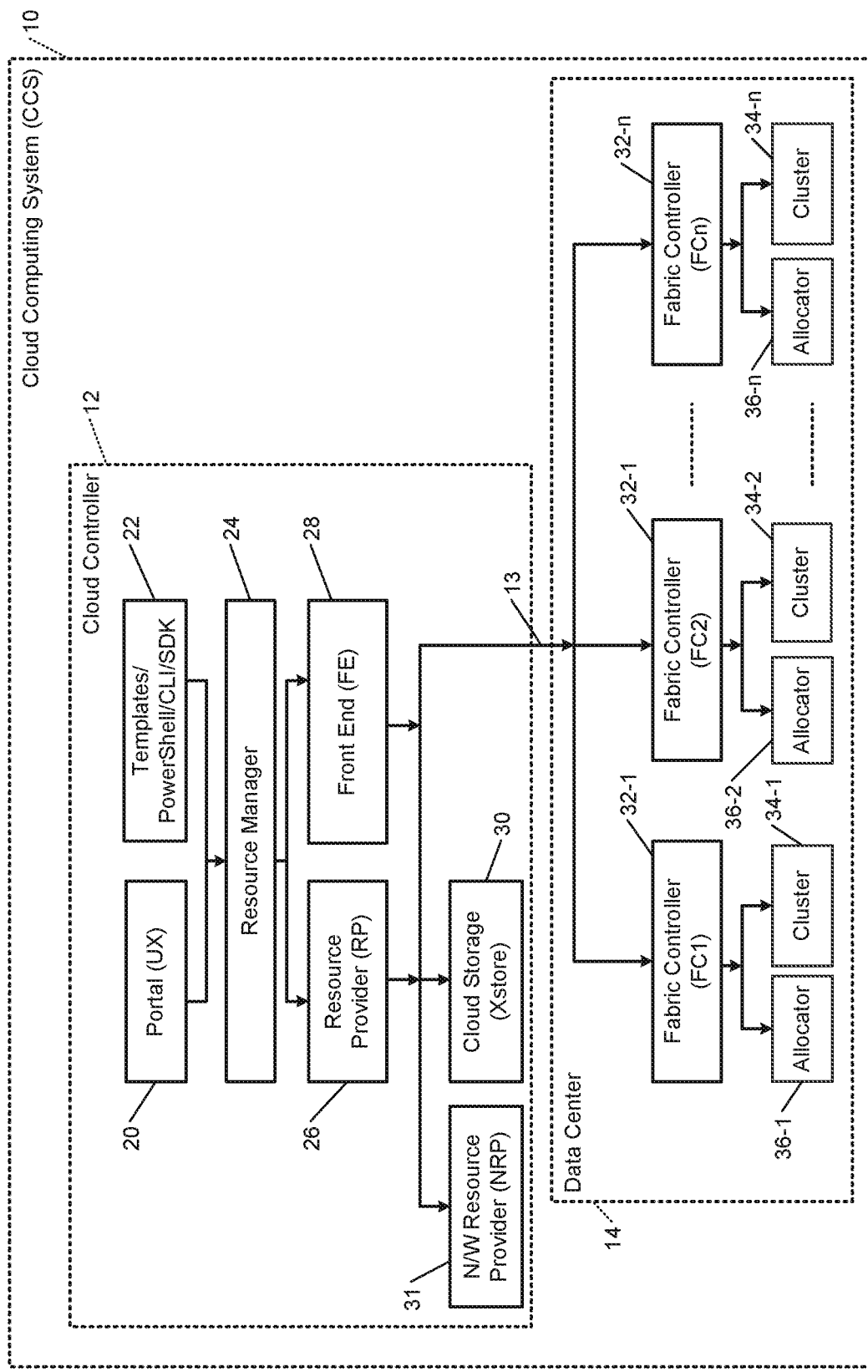
FIG. 1 is a functional block diagram of a simplified example of a cloud computing system.

The present disclosure relates to a network optimization system that can perform the following functions: First, the network optimization system can be used to probe an existing network and provide recommendations for optimizing the existing network by suggesting changes to the network topology being used in the existing network. The changes can include rearrangement and/or elimination of one or more existing network components in use. The changes can also include addition of new network components at strategic locations in the existing network. The strategic locations can be selected with the knowledge gained from probing the existing network rather than selecting the locations randomly or blindly without the knowledge of the existing network. The changes can also include a complete overhaul of the existing network. The complete overhaul can include replacing the entire existing network by a newly designed network with new network components.

Second, the network optimization system can be used to probe an existing network and provide recommendations for optimizing the existing network by suggesting changes to applications and services consumed in the existing network with or without changing the topology of the existing network. For example, the network optimization system can make the applications and services consumed in the existing network aware of the topology of the existing network. The topology-aware applications and services can then be optimized (reconfigured) to provide the best possible performance in the existing network. In some implementations, the topology of the existing network may also be altered using one or more ways mentioned above in the first function.

Third, the network optimization system can be used to design a new network from ground up based on customer specifications and connectivity options (infrastructure) that are geographically available to the customer. In this approach, the applications and services that will be consumed in the new network can be made aware of the topology of the new network to provide the best possible performance in the new network. In other words, the network optimization system can recommend configurations for the applications and services based on the design of the new network to optimize the performance of the applications and services when executed on the new network. In addition, the network optimization system can continue to monitor and refine the hardware/software in the new network after installation as mentioned above in the first and second functions.

In one or more of these approaches, the network optimization system can use simulation-based prototyping (modeling) techniques to suggest multiple alternative designs for the network using graph theory (explained below). These and other aspects of the present disclosure are described below in detail.

Often, within public cloud deployments, there are scenarios that necessitate discovering the network topology (e.g., the number of hops between different end-points and the flow patterns thereon). The network optimization system of the present disclosure uses the information about the discovered network topology (e.g., on-premises network design) to provide recommendations on optimal designs for the network based on running graph theory algorithms. A cloud computing system can be equipped with the network optimization system comprising a simulation and optimization tool, using which customers can visualize their network topology. Moreover, customers can use this tool to identify service performance issues within the on-premises network topology and the last mile portion of the network that reaches the premises.

The network optimization system may include the following features: a tool that may be installed and run on an on-premises datacenter that discovers the network topology; a functionality provided within the tool that recommends an optimal network topology that would improve the network topology (by reducing hops, layers, and loops in network topology leading to a gateway) via a user interface, for example; and a functionality in the tool to help customers manage their network infrastructure, technology debt, and network technology roadmap with milestones such as when to upgrade, step function of upgrades, a minimum network capability requirement based on load/utilization variables.

In other words, the network optimization system may be implemented as an application running on a processor that, when executed, performs a method comprising the following: discovering aspects of a network topology, wherein the network topology includes hardware/software within an on-premises datacenter and hardware/software in the last few hops leading up to that datacenter; generating a representation that allows a user to visualize their network topology; accessing network parameters that are to be optimized (e.g., parameters for reducing cost or more efficient management of the network); determining an optimal network topology using the discovered network topology and the accessed network parameters, wherein creating the optimal network topology involves running simulations; providing remedial measures to the user; showing the representation of the network topology and/or optimized topology to the user on a graphical user interface; recommending changes to the network topology that reflect the optimal topology (e.g., suggesting usage/repurposing scenarios of current infrastructure); and recommending changes to other attributes of the network (e.g., applications/services and so on).

The present disclosure is organized as follows. First, an overview of the present disclosure is provided, which includes brief descriptions of problems typically encountered in legacy networks, causes of the problems, and solutions proposed by the network optimization system of the present disclosure. Thereafter, a brief overview of the graph theory utilized by the network optimization system is presented. Subsequently, examples of systems and methods for implementing the solutions proposed by the network optimization system of the present disclosure are described with reference to various block diagrams shown in FIGS. 1-3B and flowcharts shown in FIGS. 4-6. An example of pseudocode for the implementing the network optimization system is provided. Thereafter, a client-server based architecture for implementing the network optimization system of the present disclosure is described with reference to FIGS. 7-9.

Overview: Often, some customers may experience poor network performance when accessing on-premises and cloud-based services. Generally, the cause of the poor network performance is the on-premises network topology and the last-mile access from the on-premises network to the external network infrastructure (e.g., to the Internet). In most cases, the network performance and user experience can be improved by 10×-100× by remedying the on-premises and the last mile network topologies as follows.

Using the network optimization system of the present disclosure, customers can visualize their network topology (of existing or to be installed networks). The customers can identify service performance based on the network topology used on premises and the last mile network reaching the premises. The network optimization system can recommend optimal network topology that would improve the network performance by reducing number of layers, hops, and loops in the network topology leading to the gateway with up to 200× improvement in cloud service performance. The network optimization system can also include multi-year cost of ownership and cost of service models that can help in financial modeling of onboarding customers to a cloud computing platform.

The network optimization system can be offered as a value-added service or as a free service embedded in operating systems, servers, and cloud portal. The network optimization system can also be distributed as software-as-a-service (SaaS) that customers can subscribe to. The network optimization system can assist customers in managing their network infrastructure, technology debt, and network technology roadmap with milestones such as when to upgrade, step function of upgrades, minimum network capability requirements based on load/utilization variables, etc.

Without an efficient network topology, which can often be the case in underdeveloped communities and developing countries, there can a major information gap, where access to information is essentially structurally disabled. The causes of ineffective networks can be many and can include the following, for example: a lack of alignment between different network infrastructures including the last-mile (on-premises to external network connectivity), middle-mile (ISP to on-premises connectivity), and long-range (ISP to national backbone, under-sea connectivity) network infrastructures; improper on-premises network design (e.g., a multi-layered network with switches buried in unnecessary hierarchies of routers); multiple hops involved in reaching a gateway to egress on-premises network for accessing external networks such as the Internet; and a lack of best practice templates and benchmarks for on-premises, middle-mile, and long range network architecture in emerging and developing markets.

The problem is further exacerbated in the developing markets as inexpensive (low bandwidth) routing gear is extensively used throughout the network infrastructure. Often, switches with disparate network capabilities (e.g., speeds, bandwidths, protocols, etc.) are layered over each other to mitigate limited port counts and port exhaustion while stripping capacity. Also, the investment in the network infrastructure is staggered over several years. Due to purchases made at different times and with money still owed for older purchases (generally called technology debt), low bandwidth gear can often linger upstream or downstream of higher bandwidth gear. This results in bottlenecks and congestion for network traffic, which further increases latencies of routers, and degrades or cripples service performance for users.

Typically, most application and service providers tend to provide applications and services while leaving the design and implementation of networks for running the applications and services to the customers. That is, most application and service providers tend to provide applications and services without a connectivity plan to connect to the global backbone. For example, while some server setup literature includes instructions for setting up a network, there is little information on best practices for optimal network design, how to optimally peer with external networks, or about laying out gateways for best network performance and user experience. While some customers can hire experts to design and implement the best networks to run the applications and services, designing and implementing new networks, upgrading existing networks, and interfacing new networks with existing networks to efficiently run the applications and services take significant amount of time, money, and human resources. The same is often the case when a single source, often a systems integrator, provides complete solutions including supplying the applications and services and also the networks to run the applications and services.

The network optimization system according to the present disclosure can discover the network topology, bottlenecks and design constraints, the number of hops between different end-points, and can generate flow patterns between different end-points. The network optimization system can construct a model of an as-is on-premises network and provide recommendations for optimal network designs using graph theory (explained below). The problems associated with layering of routers and switches, port exhaustion, and carrying over of technology debt can be resolved using graph theory/simulation analytics. This approach can be generalized to any network topology used in small, medium, and large enterprises.

The network optimization system can offer solutions for the challenges involved in onboarding customers to a cloud ecosystem to optimize customer experience when using cloud-based services. For example, the network optimization system can offer templates to design smart and efficient on-premises networks. The network optimization system can provide prototypes of redesigned (if existing) or optimally-designed (if new) network topologies that are complete with simulations and optimizations. The network optimization system can recommend an optimal network topology based on, for example, a star-schema, multiple spanning tree (MST) with pruning, and so on.

Normally, it can take several weeks if not months for world class network architects to layout such network topologies by applying iterative approaches to network design. In contrast, the network optimization system of the present disclosure can quickly and inexpensively improve bandwidth and accessibility of networks for millions of people, particularly in the third world countries, who currently cannot receive broadband connectivity due to problems of congestion and layering involved in fragmented and haphazard on-premises network designs. The network optimization system can not only solve existing problems by optimizing currently used legacy network infrastructure but can also help prevent future problems by providing network designs that can grow with and adapt to the evolving technologies.

Graph Theory: A graph is a structure comprising a set of objects (e.g., elements or components of a network) wherein some pairs of the objects are related in some sense. These objects can be called vertices (also called nodes or points), and each of the related pairs of vertices is called an edge (also called an arc or line). Typically, a graph is depicted in diagrammatic form as a set of dots or circles representing the vertices, which are joined by lines or curves representing the edges.

The edges may be directed or undirected. For example, if the vertices represent people at a party, and there is an edge between two people if they shake hands, then this graph is undirected because any person A can shake hands with a person B only if person B also shakes hands with person A. In contrast, if an edge from person A to person B corresponds to person A admiring person B, then this graph is directed because admiration is not necessarily reciprocated. The former type of graph is called an undirected graph, and the edges are called undirected edges. The latter type of graph is called a directed graph, and the edges are called directed edges. In computer networks, the edges may be directed or undirected depending on data flows between vertices representing network nodes.

A graph can be represented as an ordered pair $G=(V, E)$ comprising a set of V vertices, nodes, or points with a set of E edges, arcs, or lines, which are 2-element subsets of V (i.e., an edge is associated with two vertices, and the association takes the form of the unordered pair of the vertices). The vertices belonging to an edge are called the ends or end vertices of the edge. The order of a graph is $|V|$, which is the number of vertices in the graph. The size of a graph is $|E|$, which is the number of edges in the graph. The degree or valency of a vertex is the number of edges that connect to the vertex, where an edge that connects to the vertex at both ends (a loop) is counted twice.

Graphs can be used to model many types of relationships and processes in physical, biological, social, and information systems. Many practical problems can be represented by graphs. In computer science, graphs are used to represent networks of communication, data organization, computational devices, the flow of computation, etc. For instance, a link structure of a website can be represented by a directed graph, in which the vertices represent web pages, and directed edges represent links from one page to another. A similar approach can be extended to problems in computer chip design, analysis, and design of computer networks (e.g., in datacenters) and many other fields.

In computer networks, various network nodes (e.g., computing devices such as servers and clients, switches, routers, gateways, etc.) can be represented by vertices, and interconnections between various network nodes can be represented by edges. Thus, a computer network can be represented by a graph. One or more graph theory algorithms can then be applied to the graph to analyze, model, and redesign the computer network. Below are some examples of graph theory algorithms that are used to solve some of the above-mentioned problems in computer networks.

For example, the Dijkstra's algorithm can be used to find the shortest paths between nodes in a graph, which may represent, for example, a computer network. For a given source node in the graph, the algorithm finds the shortest path between that node and every other node. The Dijkstra's algorithm can also be used to find the shortest paths from a single node to a single destination node by stopping the algorithm once the shortest path to the destination node has been determined. As a result, the shortest path algorithm can be used in network routing protocols.

The Kruskal's algorithm is a minimum-spanning-tree (MST) algorithm that finds an edge of the least possible weight that connects any two trees. The Kruskal's algorithm finds a subset of the edges that forms a tree that includes every vertex, where the total weight of all the edges in the tree is minimized. If the graph is not connected, then the Kruskal's algorithm finds a minimum spanning forest (i.e., a minimum spanning tree for each connected component).

The Prim's algorithm finds a MST for a weighted undirected graph. That is, Prim's algorithm also finds a subset of edges that forms a tree that includes every vertex, where the total weight of all the edges in the tree is minimized. The algorithm operates by building this tree one vertex at a time, from an arbitrary starting vertex, at each step adding the cheapest possible connection from the tree to another vertex.

The depth-first search (DFS) is an algorithm for traversing or searching a tree or graph data structures. The DFS algorithm starts at the root (by selecting some arbitrary node as the root in the case of a graph) and explores as far as possible along each branch before backtracking.

The breadth-first search (BFS) is an algorithm for traversing or searching tree or graph data structures. The BFS algorithm starts at the tree root (or some arbitrary node of a graph, sometimes called a search key) and explores the neighbor nodes first before moving to the next level neighbors.

The Bellman-Ford algorithm computes the shortest paths from a single source vertex to all other vertices in a weighted digraph; and so on.

These and other graph theory algorithms can be used to analyze computer networks such as those installed in datacenters. The computer networks can be represented using graphs, and the graphs can be analyzed using one or more algorithms. Networks can be probed by monitoring network traffic, issuing investigative commands (e.g., ping), injecting information (e.g., test data) into the network and monitoring flow of the injected information through the network, etc. Data gathered by probing the networks such as number of hops, layers, and loops can be analyzed, and visual representations of the network can be created (e.g., in the form of a model of the network). Simulations can be run using the data to examine flow patterns between various nodes in the network. Prototypes (models) of various network configurations can be built and examined (analyzed) for performance using the simulations (e.g., by modifying models, rearranging existing network elements, removing existing network elements, and/or adding new network elements). The simulations can be run and the prototypes can be built and analyzed using graph theory algorithms until an optimal network configuration can be found and recommended. A new network can also be built from ground up and can be subsequently monitored and optimized using similar methodology.

Figure 4:
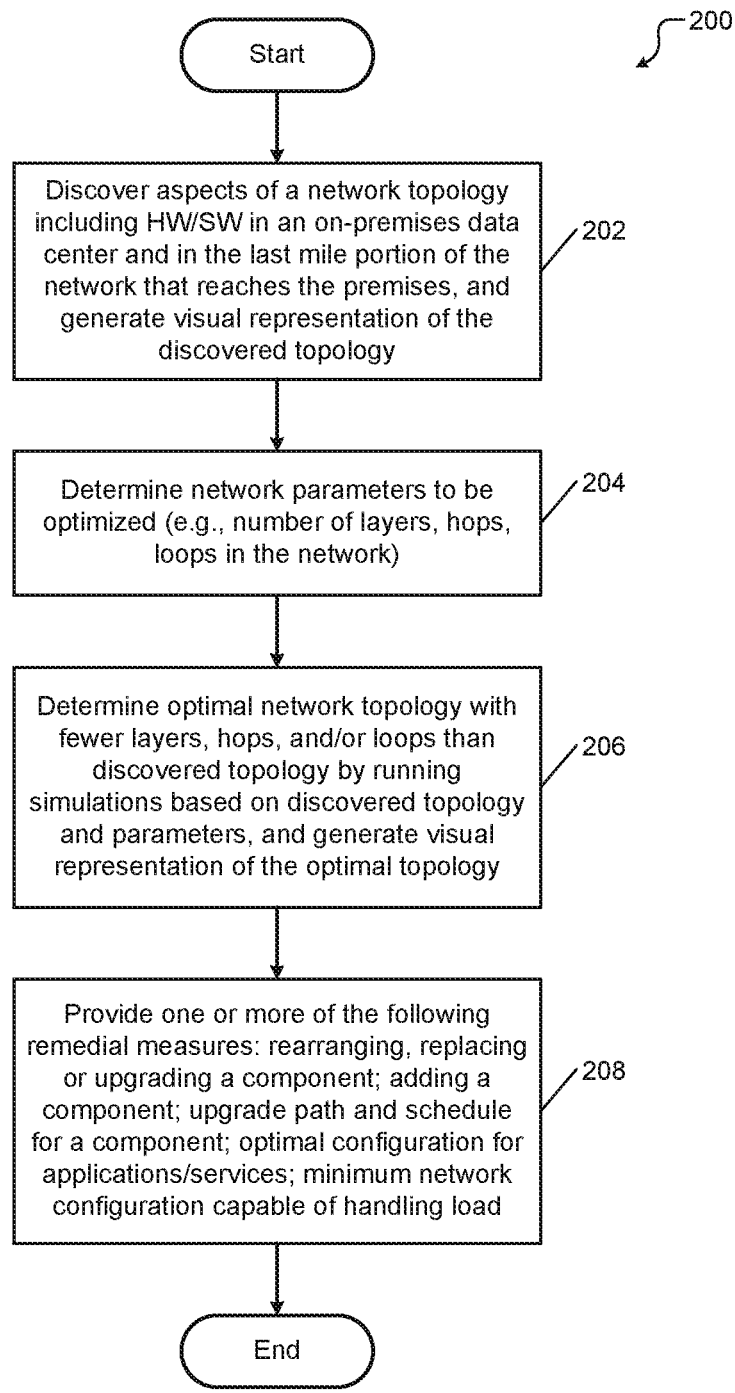
FIG. 4 shows a flowchart of a method for optimizing a network installed in the datacenter shown in FIGS. 1 and 2.
Figure 5:
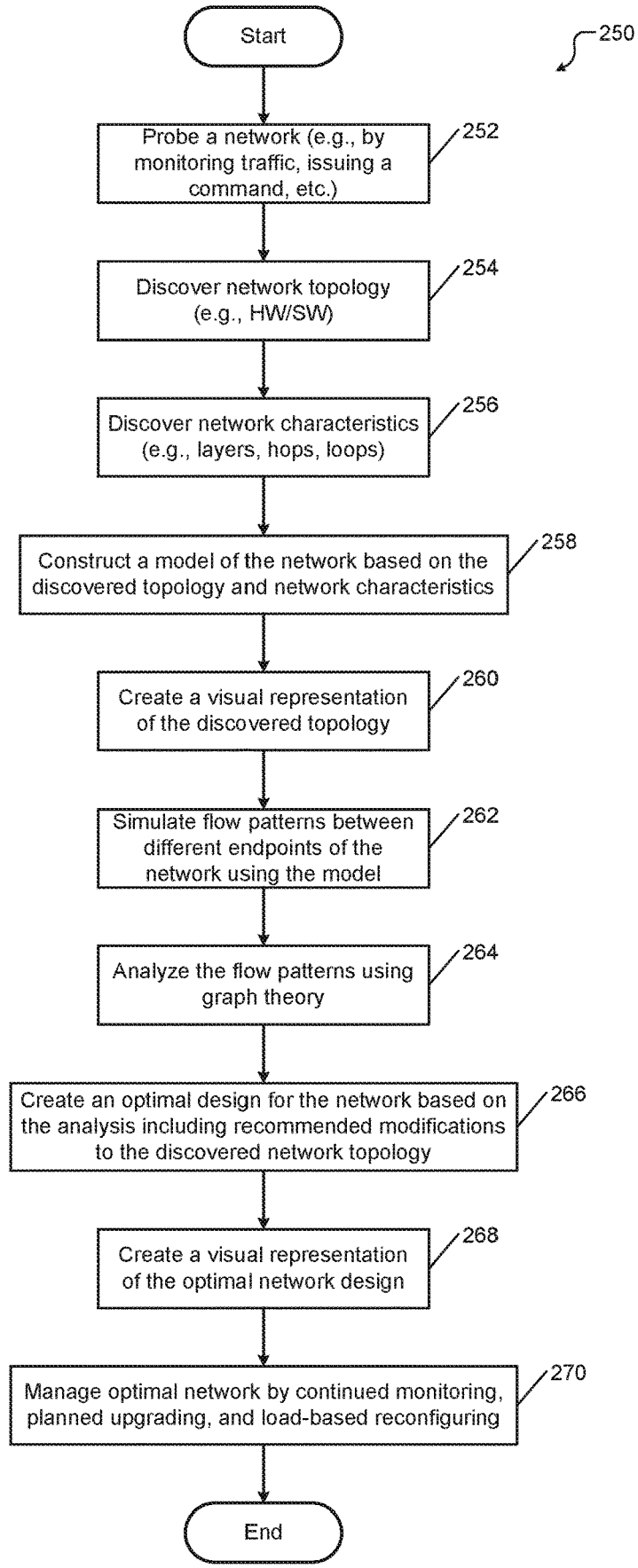
FIG. 5 shows a flowchart of another method for optimizing a network installed in the datacenter shown in FIGS. 1 and 2.
Figure 6:
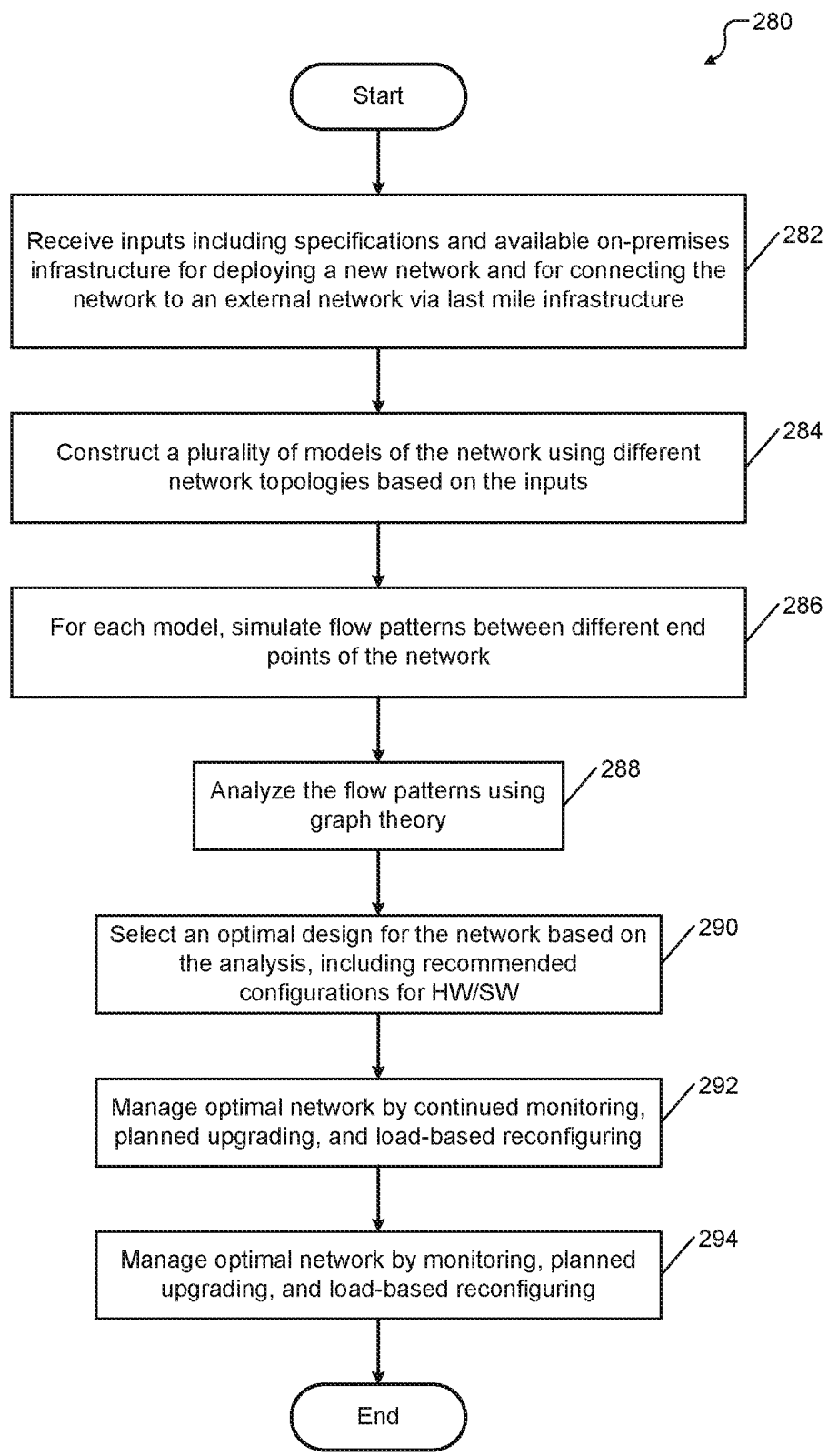
FIG. 6 shows a flowchart of a method for designing an optimal network to be installed in the datacenter shown in FIGS. 1 and 2.

The network optimization system: Examples of systems and methods for implementing the network optimization system of the present disclosure are now presented. FIGS. 1-3B show examples of a cloud computing system and a datacenter where the network optimization system can be implemented. FIGS. 4-6 show methods for implementing the network optimization system.

FIG. 1 shows a simplistic example of a cloud computing system (CCS) 10. The cloud computing system 10 includes a cloud controller 12 and at least one datacenter 14. While only one datacenter 14 is shown for simplicity, the cloud controller 12 can interface with a plurality of datacenters. Further, while the datacenter 14 is shown as being local to the cloud controller 12, one or more datacenters may be geographically remote from the cloud controller 12, may be located in different geographic locations (e.g., in different time zones, different countries or continents, and so on), and may communicate with the cloud controller 12 via various networks 13. For example, depending on the geographic location of the datacenter 14 relative to the cloud controller 12, the networks 13 may include last-mile, middle-mile, and/or long-range network infrastructure.

Each datacenter 14 includes a plurality of fabric controllers 32-1, 32-2, . . . , and 32-n (collectively fabric controllers or FC's 32) and corresponding clusters 34-1, 34-2, . . . , and 34-n (collectively clusters 34). Each fabric controller 32 controls a respective cluster 34. Each cluster 34 includes a plurality of racks (see FIGS. 2-3B), and each rack includes a plurality of nodes (see FIGS. 3A and 3B). The nodes are also called servers, hosts, machines, or computing devices throughout the present disclosure. Each fabric controller 32 is associated with an allocator 36. The allocator 36 allocates resources within the cluster 34 for instances of services hosted on the cluster 34.

The datacenter 14 represents an example of an on-premises network that can exist at an institution such as a university or a company campus, for example. The datacenter 14 may be spread out between several floors of a building or across many buildings in a campus. Various components of the datacenter 14 that are distributed in different floors and buildings may be networked together using one or more suitable networks (e.g., local area networks or LAN's, wide area networks or WAN's, etc.). The networks may include several layers of components. Each layer may include a plurality of computing devices (e.g., servers and clients), switches, and routers. The datacenter 14 may connect to an external network such as the Internet via a gateway 15 (see FIG. 2) using the available last mile infrastructure proximate to the datacenter 14. The datacenter 14 may run one or more applications and services (e.g., installed locally in the datacenter 14, and/or subscribed from the cloud computing system 10 and accessed via the gateway 15).

The cloud controller 12 includes a portal 20 and a software development kit (SDK) 22 that the customers can use to select resources and request service deployment. The cloud controller 12 further includes a cloud resource manager 24, a compute resource provider 26, and a front-end 28. The front-end 28 interfaces with the fabric controllers 32. The cloud resource manager 24 receives the customer selections and forwards the customer selections to the compute resource provider 26. The compute resource provider 26 generates a tenant model based on the customer selections. The compute resource provider 26 provisions resources to the customer services according to the tenant model generated based on the customer selections. The compute resource provider 26 provisions storage, networking, and computing resources by interfacing with a cloud storage (Xstore) 30, a network resource provider 31, and the fabric controllers 32.

In addition, the compute resource provider 26 (or the network resource provider 31) can host the network optimization system of the present disclosure. The network optimization system can provide recommendations for a new network design to be deployed in the datacenter 14 or for modifying an existing network design of the datacenter 14 as described above and as described below with reference to FIGS. 4-6.

Figure 2:
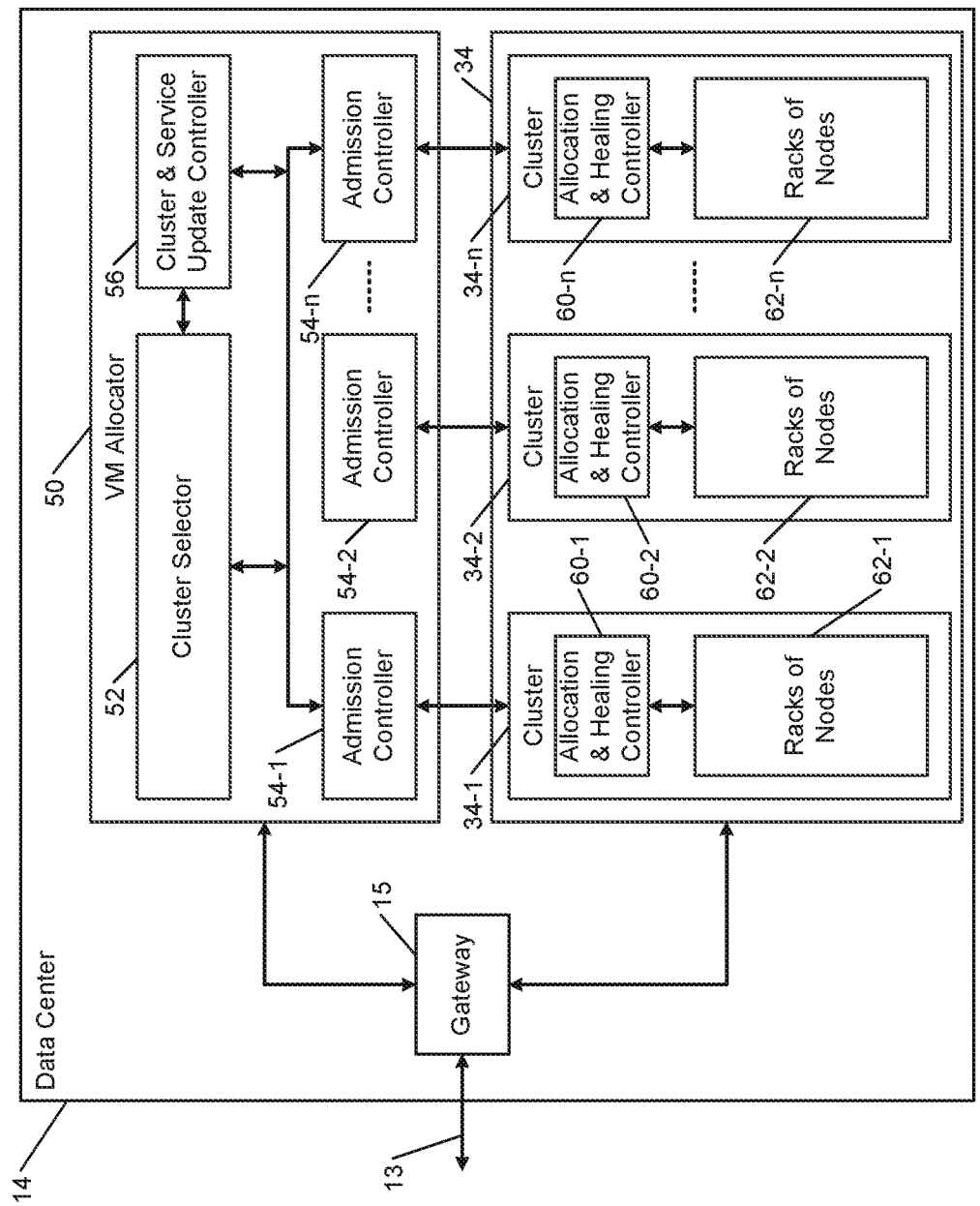
FIG. 2 is a functional block diagram of a simplified example of a datacenter shown in FIG. 1.

FIG. 2 shows a simplistic example of the datacenter 14 shown in FIG. 1. The datacenter 14 connects to an external network (e.g., the networks 13 that may include last-mile, middle-mile, and/or long-range network infrastructure) via the gateway 15. While many functionalities and features of the datacenter 14 are shown and described with reference to FIGS. 1-3B, the actual functionalities and features of a datacenter may vary depending on customer needs, available infrastructure, and the ability of a customer to design, implement, and maintain networks at the datacenter 14. Understanding these functionalities and features can help in appreciating how the network design used to interconnect various components of the datacenter 14 can impact the performance of the overall operation of the datacenter 14. Further, the understanding can help in appreciating how the network optimization system of the present disclosure can minimize the impact and improve the performance of the overall operation of the datacenter 14.

For example, the datacenter 14 may utilize virtual machines (VM's) to run applications and services, and may include a VM allocator 50 and the clusters 34. The VM allocator 50 may include a cluster selector 52 and a plurality of admission controllers 54-1, 54-2, and . . . , and 54-n (collectively admission controllers 54). Each admission controller 54 is associated with a corresponding cluster 34. Each cluster 34 may include an allocation and healing controller 60 (shown as a plurality of allocation and healing controllers 60-1, 60-2, . . . , and 60-n; one allocation and healing controller 60 per cluster 34); and one or more racks 62 of nodes (shown as racks 62-1, 62-2, . . . , and 62-n). The allocation and healing controller 60 can implement the allocator 36 of FIG. 1.

Allocating a VM can be a multilevel allocation operation. The VM allocator 50 first selects one of the clusters 34 in which to allocate a VM in association with the corresponding admission controller 54. After the VM allocator 50 selects one of the clusters 34 to allocate the VM, the allocation and healing controller 60 of the selected cluster 34 places the VM on one or more of the nodes in one or more of the racks 62 in the selected cluster 34 depending on the number of update and fault domains and other resources specified by the customer. Accordingly, the networking components used to interconnect the racks 62 and the clusters 34 can greatly impact the performance of the VM.

Based on VM activity in the clusters 34, a cluster and service update controller 56 provides updates to the cluster selector 52. For example, the VM activity may include activation and termination of one or more VM's in the clusters 34. The cluster and service update controller 56 may also provide updates to the cluster selector 52 regarding utilization of growth buffers due to service scale out and utilization of healing buffers due to node/rack failures. Again, any configuration changes made in response to these updates (e.g., moving VM's to other nodes 72 within a rack 62 or from one rack to another within a cluster 34) can be affected by the networking components used to interconnect the nodes 72 and the racks 62.

Figure 3B:
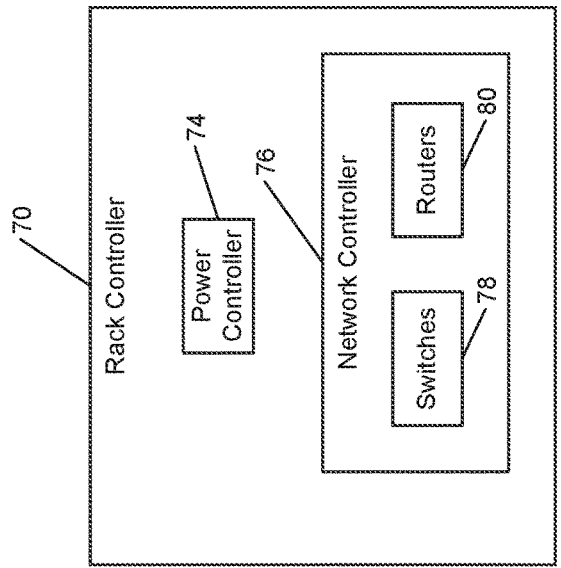
FIG. 3B is a functional block diagram of a simplified example of a rack controller used in the cluster shown in FIG. 3A.
Figure 3A:
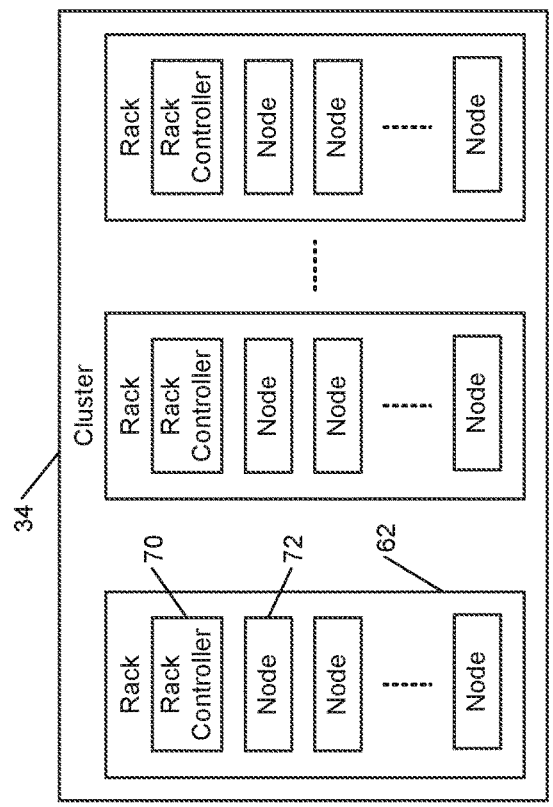
FIG. 3A is a functional block diagram of a simplified example of a cluster shown in FIG. 2.

FIGS. 3A and 3B show an example of the cluster 34 shown in FIGS. 1-2. In FIG. 3A, each cluster 34 includes the plurality of racks 62. Each rack 62 includes a rack controller 70 and a plurality of nodes 72. In FIG. 3B, each rack controller 70 may include a power controller 74 that controls power allocation to the plurality of nodes 72 in the rack 62. Each rack controller 70 may also include a network controller 76 that controls interconnections between the plurality of nodes 72 in the rack 62 and interconnections between the rack 62 and other racks using one or more network components (e.g., switches 78 and routers 80). The network controller 76 in each of the rack controllers 70 may include one or more of network components (e.g., switches 78 and routers 80).

One or more network components (e.g., switches 78 and routers 80) may also be used to interconnect the clusters 34 and the fabric controllers 32. Accordingly, depending on the layout and the expanse of the datacenter 14 (e.g., number of floors in a building, number of buildings, number of nodes, etc.), the datacenter 14 can comprise one or more networks (e.g., LAN's and WAN's) with various network components such as switches and routers distributed in various layers of the respective networks.

Further, depending on the network design and/or upgrades performed, these network components may have different capabilities (e.g., speeds, bandwidths, protocol versions, etc.). For example, one or more of these network components may have been manufactured with older technologies and may coexist with other network components that have been upgraded to or manufactured using more recent technologies. One or more of the following methods may be used to alleviate the problems caused by such network components (i.e., hybrid network topologies) and to improve the performance of the applications and services running in the datacenter 14.

FIGS. 4-6, which are described below in detail, show methods that can redesign/reconfigure one or more aspects of the network deployed (or to be deployed) in the datacenter 14. These methods can be implemented in the cloud controller 12 and can be made available to customers as part of cloud onboarding process (i.e., procedure used to establish a datacenter such as the datacenter 14 within the cloud computing system 10). Alternatively or additionally, these methods can be implemented in one or more computing devices (e.g., servers, clients) on the premises of the datacenter 14.

In the following description, the term control denotes instructions executed by a processor of a computing device (e.g., a server, a network controller, etc.) in the cloud controller 12 or the datacenter 14 depending on the implementation. The term control also refers to one or more of the client and server applications 366 and 386 described below with reference to FIGS. 7-9 that implement the network optimization system and the methods shown in FIGS. 4-6. In other words, the term control represents code or instructions executed by one or more components of the cloud computing system 10 shown in FIGS. 1-3B to perform the described functionality.

FIG. 4 shows a method 200 for optimizing a network according to the present disclosure. At 202, control discovers aspects of the network topology including hardware/software in an on-premises datacenter (e.g., the datacenter 14 shown in FIGS. 1-3B) and in the last mile portion of the network that reaches the premises. Control also generates a visual representation of the discovered topology of the network using a user interface.

At 204, control determines network parameters to be optimized (e.g., number of layers, hops, loops in the network). At 206, control determines an optimal network topology with fewer layers, hops, and loops than those in the discovered topology. Control determines the optimal network topology by running simulations based on the discovered topology and parameters. Control also generates a visual representation of the optimal network topology.

At 208, based on the simulations, control provides remedial measures such as the following: rearranging (repurposing), replacing, or upgrading a network component; adding a new network component; an upgrade path and an upgrade schedule for a network component; an optimal configuration for one or more applications/services running on the network; a minimum network configuration capable of handling the load; and so on.

FIG. 5 shows a method 250 for optimizing a network according to the present disclosure. At 252, control probes a network (e.g., by monitoring network traffic, issuing a network command such as ping, injecting test data into the network and monitoring the flow of the injected test data through the network, and so on). At 254, control discovers the network topology (e.g., hardware/software configurations of various components of the network) based on data collected by probing the network. At 256, control discovers various network characteristics including number of layers, hops, loops in the network.

At 258, control constructs a model of the network based on the discovered topology and network characteristics. At 260, control generates a visual representation of the discovered network topology.

At 262, control simulates flow patterns between different endpoints of the network using the model. At 264, control analyzes the flow patterns using graph theory. At 266, control generates a recommendation including an optimal design for the network based on the analysis. For example, the recommendation may include a modification to the discovered network topology such as upgrading a network component and/or replacing a network component. The recommendation reduces one or more of the number of hops between the different endpoints of the network, the number of layers in the network, and/or the number of loops in the network. At 268, control creates a visual representation of the optimal network design.

Other non-limiting examples of recommendations may include one or more of the following. The recommendations reduce one or more of the number of hops between the different endpoints of the network, the number of layers in the network, and/or the number of loops in the network. When the network in the datacenter includes switches and routers in different layers having different speeds or bandwidths, the recommendation may include an alternate design for the network that reduces the number of switches and routers having dissimilar speeds or bandwidths in at least one of the layers. The alternate design may eliminate one or more switches and routers having less than a predetermined speed or bandwidth in at least one of the layers. The alternate design may eliminate one or more of the layers of switches and routers having less than a predetermined speed or bandwidth. The alternate design may eliminate one or more of the layers having more than a predetermined number of switches and routers of dissimilar speeds or bandwidths.

In still other examples, the alternate design may include an additional switch or router having a similar speed or bandwidth as that of one of the switches or routers in at least one of the layers. The alternate design may include an additional switch or router having a speed or bandwidth greater than that of the switches or routers in the layers. The additional switch or router may be added to the network at a location determined to reduce one or more of the number of hops between the different endpoints of the network, the number of layers in the network, and/or the number of loops in the network.

In additional examples, the analysis may identify elements (components) of the network topology that imped the traffic through the network (e.g., due to slower elements mixed with faster elements in one or more layers). The alternate design may exclude one or more of the elements and/or may include a modification to the one or more of the elements, where the modification includes a rearrangement (repurposing) and/or an upgrade of the one or more of the elements.

At 270, control manages the optimal network by continued monitoring, planned upgrading, and/or load-based reconfiguring (e.g., determining and recommending a minimum configuration sufficient to handle the load) of the optimal network. For example, control may manage the optimal network by repeating the method 250 (e.g., probing the network etc.).

FIG. 6 shows a method 280 for designing an optimal network from ground up according to the present disclosure. At 282, control receives inputs including specifications and available on-premises infrastructure for deploying a new network and for connecting the new network to an external network such as the Internet via the available last mile infrastructure. At 284, control constructs a plurality of models of the network using different network topologies based on the inputs.

At 286, for each model, control simulates flow patterns between different endpoints of the network. At 288, control analyzes the flow patterns using graph theory. At 290, control selects an optimal design for the network based on the analysis. The optimal design includes recommended configurations for the hardware/software of the network. At 292, control creates a visual representation of the optimal network design.

At 294, control manages the optimal network by monitoring, planned upgrading, and load-based reconfiguring (e.g., determining and recommending a minimum configuration sufficient to handle the load) of the optimal network. For example, control may manage the optimal network by performing the method 250 shown in FIG. 5.

Pseudocode: Below is an example of pseudocode for implementing the network optimization system and the methods described above. For example, the pseudocode for discovering the network topology can include the following: 1. Send a tracer to determine all the active and inactive routing paths. 2. Use TCP to send a small (less than 1 KB) of file through the active and inactive paths. 3. Use the TCP session to determine the per hop topology per path. 4. Construct a graph out of the per hop topology on each path.

Below is an example of pseudocode for discovering the network topology; simulation, analysis, and comparison of various alternative designs; and selection of the best one of the alternative design as described above.

```
$deviceDictionary = $results[0]
$linkDictionary = $results[1]
$srcRoters = $results[2]
$userRouters = $results[3]
$userRoutersKeys = @( )
$userRoutersKeys += "ISP.AccessPoint"
foreach($key in $userRouters.Keys)
{
    $userRoutersKeys += $key
}
$userRouters1 = $userRoutersKeys[1..($userRoutersKeys.Count – 1)]
$userRouters2 = $userRoutersKeys[0..($userRoutersKeys.Count – 2)]
$userRouterLinks = @{ }
for($i=0; $i -lt $userRouters1.Count; $i++)
{
   $key = "$($userRouters1[$i])_$($userRouters2[$i])"
   $userRouterLinks[$key] = New-Object psobject -Property @{DeviceName = $userRouters1[$i];
       RemoteDevice = $userRouters2[$i]; Metric = 1;}
}
$columnOrder = "DeviceName", "RemoteDevice","Metric"
$userRouterLinks.Values | Select-Object $columnOrder | ConvertTo-Csv -NoTypeInformation | % {$_ -replace "", ""} | out-file -FilePath "$docPath\Links.csv" -Force -Encoding ascii
$starLinks = Make-StarTopology $userRouters $srcRoters
#$risingStar.MakeNetwork($pathToVisio, $starLinks, $pathToVisio)
Invoke-MakeVisio -FilePath: $pathToVisio -Links: $starLinks
[array]$staLinksNormalized = @( )
foreach($link in $starLinks)
{
    $linkArray = $link.Split('_')
    $linkNew = "$($linkArray[0])_$($linkArray[1])_1"
    $starLinksNormalized += $linkNew
}
```

```
-continued $results = Get-DeviceLinkUserSrcRouterSummaries $starLinksNormalized
$deviceDictionaryStar = $results[0]
$linkDictionaryStar = $results[1]
# Get mst Topology
$mstLinks = Import-Csv "$docPath\NewLinks.csv"
$mstLinksNormalized = @( )
$userRoutersOrdered = @( )
foreach($link in $mstLinks)
{
    $newLink = "$($link.Src)_$($link.Dest)_$($link.IGP)"
    $mstLinksNormalized += $newLink
    if(!$userRoutersOrdered.Contains($link.Src))
    {
        $userRoutersOrdered += $link.Src
    }
    if(!$userRoutersOrdered.Contains($link.Dest))
    {
        $userRoutersOrdered += $link.Dest
    }
}
# Get coordinates for MST to plot on visio
$radius = 3
$coordinates = Assign-RingCoordinates $userRoutersOrdered $radius
$mstLinksPlot = @( )
foreach($link in $mstLinks)
{
    $coordSrcX = $coordinates[$link.Src].X
    $coordSrcY = $coordinates[$link.Src].Y
    $coordDstX = $coordinates[$link.Dest].X
    $coordDstY = $coordinates[$link.Dest].Y
    $visioLink =
"$($link.Src)_$($link.Dest)_$($coordSrcX)_$($coordSrcY)_$($coordDstX)_$($coordDstY)"
    $mstLinksPlot += $visioLink
}
# Plot on visio
Invoke-MakeVisio -FilePath: $pathToVisio -Links: $mstLinksPlot
$results = Get-DeviceLinkUserSrcRouterSummaries $mstLinksNormalized
$deviceDictionaryMst = $results[0]
$linkDictionaryMst = $results[1]
# Original Topology
$topologySaveLocation = "$docPath\Topology.xml"
Make-Topology $deviceDictionary $linkDictionary $topologySaveLocation
# Star topology
$topologySaveLocationStar = "$docPath\TopologyStar.xml"
Make-Topology $deviceDictionaryStar $linkDictionaryStar
$topologySaveLocationStar
#Mst Topology
$topologySaveLocationMst = "$docPath\TopologyMst.xml"
Make-Topology $deviceDictionaryMst $linkDictionaryMst $topologySaveLocationMst
$saveFile = "$docPath\SwanDemands.xml"
Make-DemandFile $srcRoters $saveFile
$powershellLocation = "C:\GitNetSim\Networking\NetSim\Simulator\out\debug-
amd64\NetSimPowershellConsole"
Import-Module
"$powershellLocation\Microsoft.Autopilot.NetworkSimulator.Powershell.dll"
Import-Module
"$powershellLocation\Microsoft.Autopilot.NetworkSimulator.InputTranslators.dll"
Running Simulation with original design
$sim = New-Simulation
Reset-Network
Set-Flags -LossCalculationEnabled $false
Set-Flags -LspReservationDisabled $true
Read-SwanTopology -TopologyPath $topologySaveLocation
Set-RouterNamesWithNoDemands "Agg","Switch"
Read-SwanDemands -demands:$saveFile -Clear
Invoke-Simulation
$flowMap = $sim.FlowMap
$links = Get-Links
$flows = Get-Flows
$latencyOriginal = @{ }
foreach($f in $flows)
{
   Write-Host "Flow: $($f.TrafficDemand) latency
$($f.AverageLatencyInMilliseconds)"
   $latencyOriginal[$f.TrafficDemand.Name] = New-Object psobject -Property
@{Flow = $f.TrafficDemand;
   Latency = $f.AverageLatencyInMilliseconds}
}
```

```
Running Simulation with Star design
$sim = New-Simulation
Reset-Network
Set-Flags -LossCalculationEnabled $false
Set-Flags -LspReservationDisabled $true
Read-SwanTopology -TopologyPath $topologySaveLocationStar
Set-RouterNamesWithNoDemands "Hub"
Read-SwanDemands -demands:$saveFile -Clear
Invoke-Simulation
$flowMap = $sim.FlowMap
$links = Get-Links
$flows = Get-Flows
$latencyStar = @{ }
foreach($f in $flows)
{
    Write-Host "Flow: $($f.TrafficDemand) latency $($f.AverageLatencyInMilliseconds)"
    $latencyStar[$f.TrafficDemand.Name] = New-Obiect psobject -Property @{Flow = $f.TrafficDemand;
    Latency = $f.AverageLatencyInMilliseconds}
}
Running Simulation with Mst design
$sim = New-Simulation
Reset-Network
Set-Flags -LossCalculationEnabled $false
Set-Flags -LspReservationDisabled $true
Read-SwanTopology -TopologyPath $topologySaveLocationMst
#Set-RouterNamesWithNoDemands "Hub"
Read-SwanDemands -demands:$saveFile -Clear
Invoke-Simulation
$flowMap = $sim.FlowMap
$links = Get-Links
$flows = Get-Flows
$latencyMst = @{ }
foreach($f in $flows)
{
    Write-Host "Flow: $($f.TrafficDemand) latency $($f.AverageLatencyInMilliseconds)"
    $latencyMst[$f.TrafficDemand.Name] = New-Obiect psobject -Property @{Flow = $f.TrafficDemand;
    Latency = $f.AverageLatencyInMilliseconds}
}
Compare all three
$latencySideBySide = @{ }
foreach($key in $latencyOriginal.Keys)
{
    $idArray = $key.Split(':')
    $id = "From:$($idArray[0]) To:$($idArray[1])"
    Write-Host "Latency for Flow: $($id) Original: $($latencyOriginal[$key].Latency); Star: $($latencyStar[$key].Latency); Mst: $($latencyMst[$key].Latency)"
}
```

Client-server architecture: Below are simplistic examples of a distributed computing environment in which the network optimization system and the methods of the present disclosure described above can be implemented. Throughout the description, references to terms such as servers, client devices, applications, services, and so on are for illustrative purposes only. The terms server and client device are to be understood broadly as representing computing devices with one or more processors and memory configured to execute machine readable instructions. The terms application, service, and computer program are to be understood broadly as representing machine readable instructions executable by the computing devices.

FIG. 7 shows a simplified example of a distributed network system 300. The distributed network system 300 includes a network 310, one or more client devices 320-1, 320-2, . . . , and 320-M, and one or more servers 330-1, 330-2, . . . , and 330-N (collectively servers 330), where M and N are an integers greater than or equal to one. The network 310 may include a local area network (LAN), a wide area network (WAN) such as the Internet, or other type of network (collectively shown as the network 310). The client devices 320 communicate with the servers 330 via the network 310. The client devices 320 and the servers 330 may connect to the network 310 using wireless and/or wired connections to the network 310. The client devices 320 and the servers 330 may connect to the network 310 via one or more switches, routers, and gateways.

The servers 330 and the client devices 320 may implement one or more components of the cloud computing system 10 shown in FIGS. 1-3. For example, one or more servers 330 may implement the cloud controller 12 (specifically, the compute resource provider 26 or the network resource provider 31 of the cloud controller 12) while one or more client devices 320 may implement the fabric controllers 32. In this configuration, the one or more servers 330 may implement the network optimization system, and the one or more client devices 320 may access the network optimization system running on the one or more servers 330 and may interface with the network in the datacenter 14 that is to be optimized. Alternatively, one or more servers 330 may implement one or more components of the datacenter 14. In this configuration, the one or more servers 330 may implement the network optimization system and may interface with the network in the datacenter 14 that is to be optimized. Many different configurations of implementations are contemplated.

The servers 330 may provide multiple services to the client devices 320. For example, the servers 330 may execute a plurality of software applications. The servers 330 may host multiple databases that are utilized by the plurality of software applications and that are used by the client devices 320. In addition, the servers 330 and the client devices 320 may execute applications that implement the network optimization system and the methods of the present disclosure described above.

FIG. 8 shows a simplified example of the client devices 320 (e.g., the client device 320-1). The client device 320-1 may typically include a central processing unit (CPU) or processor 350, one or more input devices 352 (e.g., a keypad, touchpad, mouse, and so on), a display subsystem 354 including a display 356, a network interface 358, a memory 360, and a bulk storage 362.

The network interface 358 connects the client device 320-1 to the distributed network system 300 via the network 310. For example, the network interface 358 may include a wired interface (e.g., an Ethernet interface) and/or a wireless interface (e.g., a Wi-Fi, Bluetooth, near field communication (NFC), or other wireless interface). The memory 360 may include volatile or nonvolatile memory, cache, or other type of memory. The bulk storage 362 may include flash memory, a hard disk drive (HDD), or other bulk storage device.

The processor 350 of the client device 320-1 executes an operating system (OS) 364 and one or more client applications 366. The client applications 366 include an application to connect the client device 320-1 to the servers 330 via the network 310. The client device 320-1 accesses one or more applications executed by the servers 330 via the network 310. The client applications 366 may also include an application that implements the network optimization system and the methods of the present disclosure described above.

For example, the client device 320-1 may be located in the datacenter 14 and may execute one of the client applications 366 implementing the network optimization system. Alternatively, the client device 320-1 may connect to a server in the cloud computing system 10 (e.g., the compute resource provider 26 or the network resource provider 31) that executes the network optimization system. The client device 320-1 may interface with the network installed in the datacenter 14 and perform one or more methods described above, including displaying the existing and optimal network designs.

Figure 9:
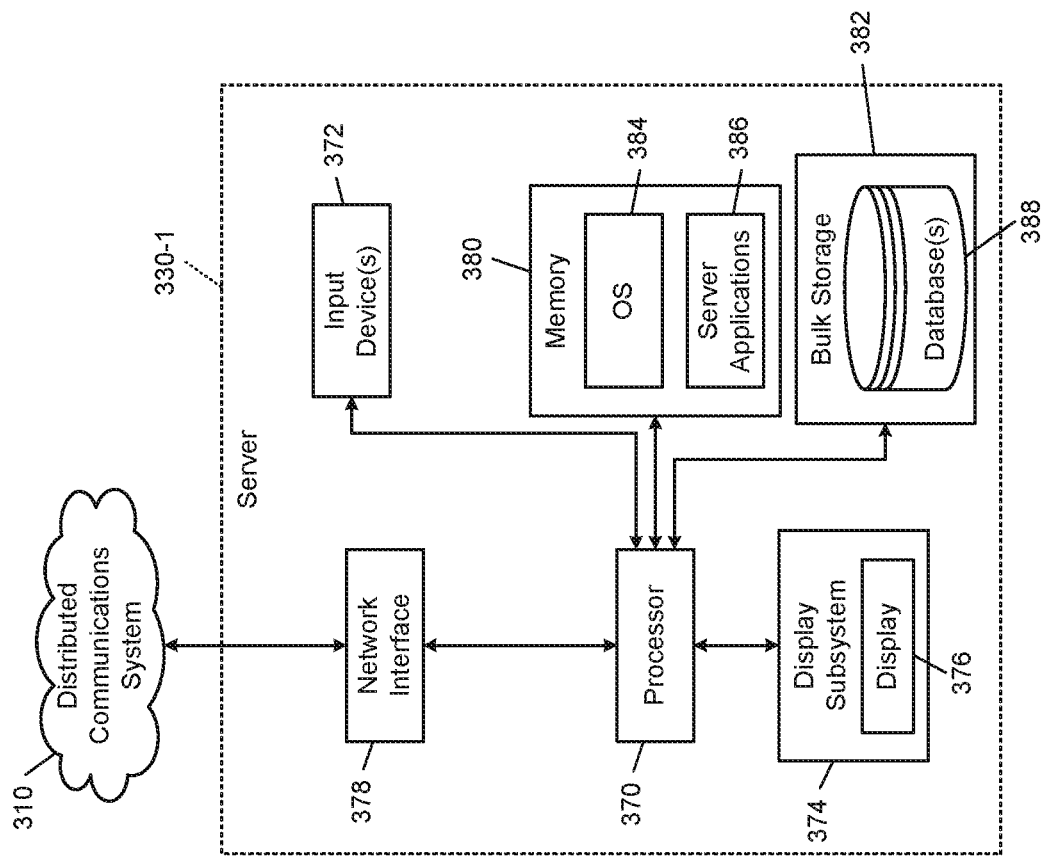
FIG. 9 is a functional block diagram of a simplified example of a server used in the distributed network system of FIG. 8.

FIG. 9 shows a simplified example of the servers 330 (e.g., server 330-1). The server 330-1 typically includes one or more CPUs or processors 370, one or more input devices 372 (e.g., a keypad, touchpad, mouse, and so on), a display subsystem 374 including a display 376, a network interface 378, a memory 380, and a bulk storage 382.

The network interface 378 connects the server 330-1 to the distributed network system 300 via the network 310. For example, the network interface 378 may include a wired interface (e.g., an Ethernet interface) and/or a wireless interface (e.g., a Wi-Fi, Bluetooth, near field communication (NFC), or other wireless interface). The memory 380 may include volatile or nonvolatile memory, cache, or other type of memory. The bulk storage 382 may include flash memory, one or more hard disk drives (HDDs), or other bulk storage device.

The processor 370 of the server 330-1 executes an operating system (OS) 384 and one or more server applications 386. The server applications 386 may include an application that implements the network optimization system and the methods of the present disclosure described above. The bulk storage 382 may store one or more databases 388 that store data structures used by the server applications 386 to perform respective functions.

For example, the server 330-1 may be located in the datacenter 14 and may execute one of the server applications 386 implementing the network optimization system. Alternatively, the server 330-1 may connect to a server in the cloud computing system 10 (e.g., the compute resource provider 26 or the network resource provider 31) that executes the network optimization system. The server 330-1 may interface with the network installed in the datacenter 14 and perform one or more methods described above, including displaying the existing and optimal network designs.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

The invention claimed is:

1. A system comprising:
a processor; and
a non-transitory computer-readable medium to store instructions for execution by the processor, the instructions configured to:
probe a network by observing traffic through the network to discover a topology of the network and associated characteristics of the topology, the characteristics of the topology including a number of layers of switches and routers in the network, a number of hops between different endpoints of the network, a number of loops in the network, and current flow patterns representative of the observed traffic through the network between endpoints of the network;
construct a model of the network based on the discovered topology and the current flow patterns;
apply a graph theory algorithm to the model of the network, the graph theory algorithm being trained to identify a most direct path between a given endpoint of the network and each additional endpoint of the network; and
generate, based on applying the graph theory algorithm to the current flow patterns, an alternate design for the network, wherein the alternate design eliminates one or more switches and routers from the model of the network, and wherein the alternate design reduces at least one of the plurality of characteristics of the topology of the network and reduces latency relative to the discovered topology.

2. The system of claim 1 wherein the instructions are further configured to generate an alternate configuration for an application or a service executed on the network, wherein the alternate configuration mitigates effects of one or more of the plurality of characteristics of the topology of the network on the performance of the application or service executed on the network.

3. The system of claim 1 wherein the instructions are further configured to generate a visual representation of the topology of the network and an additional visual representation of the alternate design for the network.

4. The system of claim 1 wherein the instructions are further configured to:
determine an upgrade path for one or more components of the network; and include the upgrade path for the corresponding one or more components of the network in the alternate design for the network.

5. The system of claim 1 wherein the instructions are further configured to:
determine load and utilization of the network based on the probing of the network;
generate, based on the load and utilization of the network, a minimum configuration for the network that is sufficient to handle the load; and
include the minimum configuration in the alternate design.

6. The system of claim 1 wherein:
the switches and routers in different layers have different speeds or bandwidths; and
generating the alternate design includes reducing a number of switches and routers having dissimilar speeds or bandwidths in at least one of the layers.

7. The system of claim 1 wherein:
the alternate design eliminates one or more switches and routers based on the one or more switches and routers having less than a predetermined speed or bandwidth in at least one of the layers; or
the alternate design eliminates one or more of the layers of switches and routers based on the one or more switches and routers having less than a predetermined speed or bandwidth, or having more than a predetermined number of switches and routers of dissimilar speeds or bandwidths; or
the alternate design eliminates one or more of the layers of switches and routers based on the one or more switches and routers having more than a predetermined number of switches and routers of dissimilar speeds or bandwidths.

8. The system of claim 1 wherein:
the alternate design further includes an additional switch or router having a similar speed or bandwidth as that of one of the switches or routers in at least one of the layers; or
the alternate design further includes an additional switch or router having a speed or bandwidth greater than that of the switches or routers in the layers, wherein the additional switch or router is added to the network at a location determined to reduce one or more of the number of hops between the different endpoints of the network and the number of loops in the network.

9. The system of claim 1 wherein the instructions are further configured to:
identify elements of the topology that impede the traffic through the network; and
wherein generating the alternate design includes eliminating the identified elements of the topology that impede traffic through the network.

10. The system of claim 1 wherein probing the network further comprises injecting information into the network and observing a flow of the injected information through the network.

* * * * *